(12) United States Patent
Travostino et al.

(10) Patent No.: US 11,013,047 B2
(45) Date of Patent: May 18, 2021

(54) ADAPTIVE WIDE AREA NETWORK LINK ASSESSMENT

(71) Applicant: Apple Inc., Cupertino, CA (US)

(72) Inventors: Franco Travostino, San Jose, CA (US); Dieter W. Siegmund, Santa Cruz, CA (US); Daniel Lertpratchya, Campbell, CA (US); Kapil Chhabra, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 16/171,296

(22) Filed: Oct. 25, 2018

(65) Prior Publication Data

US 2019/0373660 A1  Dec. 5, 2019

Related U.S. Application Data

(60) Provisional application No. 62/679,723, filed on Jun. 1, 2018.

(51) Int. Cl.
*H04W 4/00* (2018.01)
*H04W 76/15* (2018.01)
*H04L 12/28* (2006.01)
*H04L 12/24* (2006.01)
*H04L 12/26* (2006.01)
*H04W 80/06* (2009.01)
*H04W 84/12* (2009.01)

(52) U.S. Cl.
CPC ......... *H04W 76/15* (2018.02); *H04L 12/2854* (2013.01); *H04L 41/0806* (2013.01); *H04L 43/12* (2013.01); *H04W 80/06* (2013.01); *H04W 84/12* (2013.01)

(58) Field of Classification Search
CPC ..... H04W 84/12; H04W 48/16; H04W 88/08; H04W 48/18; H04W 84/18; H04W 80/06; H04L 76/15; H04L 12/2854; H04L 41/0806; H04L 43/12
See application file for complete search history.

(56) References Cited

U.S. PATENT DOCUMENTS

2002/0132603 A1* 9/2002 Lindskog .......... H04W 72/1215
455/343.4
2005/0009530 A1* 1/2005 Rouffet ................. H04W 48/16
455/452.1

(Continued)

*Primary Examiner* — Atique Ahmed
(74) *Attorney, Agent, or Firm* — Morgan, Lewis & Bockius LLP

(57) ABSTRACT

A device implementing an adaptive wide area network (WAN) link assessment system may include a processor configured to transmit data to a WAN over a first link on a first wireless interface. The processor may be configured to, responsive to a determination based on connection information that a first escalation condition is satisfied, configure the first link to provide expanded connection information. The processor may be configured to, responsive to a second determination based on the expanded connection information that a second escalation condition is satisfied, perform a probe operation with respect to a server on the WAN over the first link. The processor may be further configured to, when the probe operation is not successfully completed within a predetermined amount of time, begin to transmit the data to the WAN over the second link on the second wireless interface.

20 Claims, 5 Drawing Sheets

(56) References Cited

U.S. PATENT DOCUMENTS

| | | | |
|---|---|---|---|
| 2005/0058151 A1* | 3/2005 | Yeh | H04W 52/46 370/445 |
| 2007/0070961 A1* | 3/2007 | Tao | H04W 88/06 370/338 |
| 2007/0189241 A1* | 8/2007 | Zhang | H04L 63/08 370/338 |
| 2008/0176548 A1* | 7/2008 | Liang | H04W 88/06 455/419 |
| 2011/0201364 A1* | 8/2011 | Capuozzo | H04W 24/10 455/466 |
| 2012/0230305 A1* | 9/2012 | Barbu | H04W 72/085 370/338 |
| 2013/0007484 A1* | 1/2013 | Gobriel | G06F 1/3287 713/320 |
| 2013/0229963 A1* | 9/2013 | Asterjadhi | H04W 68/025 370/311 |
| 2013/0247177 A1* | 9/2013 | Park | G06F 21/44 726/21 |
| 2014/0064209 A1* | 3/2014 | Anchan | H04W 76/25 370/329 |
| 2014/0280705 A1* | 9/2014 | Liik | H04L 43/087 709/217 |
| 2015/0350933 A1* | 12/2015 | Mannemala | H04W 76/18 370/225 |
| 2015/0350983 A1* | 12/2015 | Kwok | H04L 65/1016 370/331 |
| 2015/0359016 A1* | 12/2015 | Barany | H04L 43/10 709/224 |
| 2016/0066325 A1* | 3/2016 | Kim | H04W 74/0816 370/329 |
| 2016/0360489 A1* | 12/2016 | Boodannavar | H04B 7/0413 |
| 2017/0332318 A1* | 11/2017 | Vyas | H04W 76/19 |

* cited by examiner

ADAPTIVE WIDE AREA NETWORK LINK ASSESSMENT

CROSS-REFERENCE TO RELATED APPLICATIONS

The present application claims the benefit of U.S. Provisional Patent Application Ser. No. 62/679,723, entitled "Adaptive Wide Area Network Link Assessment," filed on Jun. 1, 2018, which is hereby incorporated by reference in its entirety for all purposes.

TECHNICAL FIELD

The present description relates generally to link assessment, including adaptive wide area network (WAN) link assessment.

BACKGROUND

Mobile devices may include multiple wireless interfaces, such as cellular interfaces, Wi-Fi interfaces, etc., that may be used to establish communication links with a WAN, such as the Internet. The Wi-Fi interface of a device may typically be connected to the WAN through a wireless local area network (LAN), such as through a wireless access point. Thus, when the device is connected to the WAN via the Wi-Fi interface, the device may also be connected to one or more other devices on the LAN.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
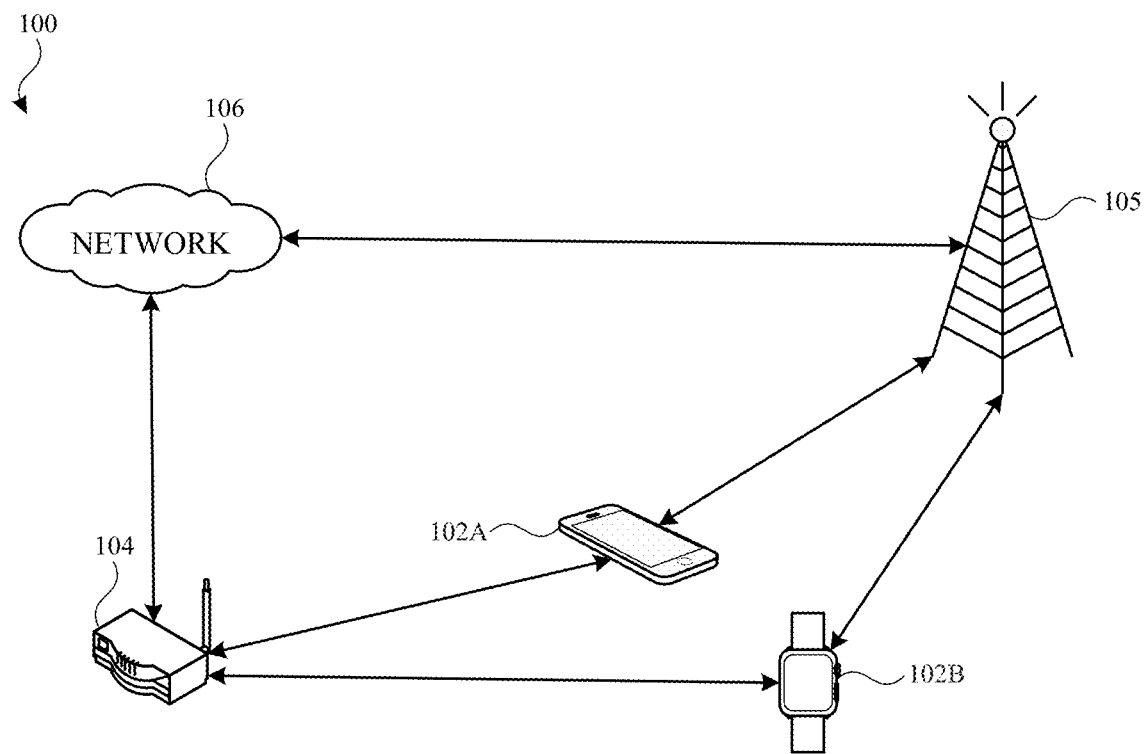
FIG. 1 illustrates an example network environment in which an adaptive wide area network link assessment system may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

When an electronic device is connected to a WAN via a LAN, the electronic device may be able to maintain a link to the LAN even when the link to the WAN is broken. For example, the link from the electronic device to the LAN may be through a wireless access point while the link to from the electronic device to the WAN may be through the wireless access point and also through a link provided by, e.g., an Internet service provider. Thus, the electronic device can have a stable connection over the LAN, and connectivity with local area network devices, even when the link to the WAN (e.g., the Internet service provider link, which may also be referred to as a wide area network link or a backhaul link) is broken. However, when the wide area network link is broken, connectivity to sites on the Internet (e.g., external to the local area network) may be lost.

When the wide area network link is broken without being detected within a certain amount of time, the performance of the electronic device may be adversely impacted. For example, applications on the electronic device may not function properly and may block usage if they are waiting to synchronize content via the WAN (e.g., the Internet). However, since the electronic device can maintain a stable connection over the LAN (e.g., via the wireless access point) even when the wide area network link is broken, the electronic device may continue to utilize the Wi-Fi interface as the primary data interface, even though the wide area network link is broken. When the electronic device eventually detects that the wide area network link is broken and/or when the wide area network link does not meet a particular performance threshold (such as excessive bit error rate or reduced bandwidth/data rate), the electronic device can switch the primary interface, e.g., to the cellular interface, to reconnect to the wide area network. In one or more implementations, the primary interface may be default interface that can be used by applications to transmit data.

In one example, the electronic device can detect a broken wide area network link by performing a probe operation (e.g. transmitting one or more probe packets) with respect to a particular server on the Internet on a periodic basis and waiting for corresponding responses. However, the network path to a single server on the Internet may not be reflective of the electronic device's Internet connectivity as a whole. Furthermore, since a broken wide area network link may be relatively rare, the periodic transmission of probes may unnecessarily consume bandwidth and/or power, which may be particularly problematic for devices with limited power supplies, such as smartwatches, other wearables, IoT devices, etc.

In the subject adaptive wide area network link assessment systems, a passive assessment of the wide area network link is performed based on connection information corresponding to application data already being transmitted over the Wi-Fi interface. When the passive assessment provides an indication that the wide area network link may be broken, the subject system adaptively escalates the passive assessment by increasing the breadth of information assessed in the passive assessment, and may ultimately escalate the assessment to an active assessment, e.g. by performing a probe operation, when the various passive assessments provide a sufficient indication that the wide area network link is likely broken. In this manner, by performing the probe operation only when the passive assessments provide a sufficient indication that the wide area network link is likely broken, the subject system avoids unnecessarily consuming bandwidth and/or power by performing the probe operation on a periodic basis, while still being able to quickly detect and respond to a broken wide area network link, thereby allowing the electronic device to transfer data connections to another interface, e.g., the cellular interface.

FIG. 1 illustrates an example network environment 100 in which an adaptive wide area network link assessment system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-B, a wireless access point 104, a cellular base station 105, and a network 106. In one or more implementations, the network 106 may be an interconnected network of devices that may include, or may be communicatively coupled to, the Internet. One or more of the electronic devices 102A-B may connect to the network 106 through the wireless access point 104 and/or through the cellular base station 105.

The electronic devices 102A-B may be computing devices, such as laptop or desktop computers, smartphones, set-top boxes, peripheral devices (e.g., watches, digital cameras, speakers), user input devices, tablets, wearable devices, smart speakers, or other appropriate devices that include wireless network interfaces, such as Wi-Fi radios, cellular radios, Bluetooth radios, and/or other wireless radios. In FIG. 1, by way of example, the electronic device 102A is depicted as a mobile device and the electronic device 102B is depicted as a smartwatch. One or more of the electronic devices 102A-B may be, and/or may include all or part of, the electronic device discussed below with respect to FIG. 2 and/or the electronic system discussed below with respect to FIG. 5.

One or more of the electronic devices 102A-B may include appropriate wireless network interfaces for establishing direct, e.g. peer-to-peer, wireless network connections, such as Wi-Fi Direct connections, Bluetooth connections, or generally any wireless network connections that may be used to perform a signal exchange, as well as Wi-Fi network connections, such as infrastructure basic service set (BSS) connections with the wireless access point 104, and cellular network connections, such as with the cellular base station 105.

The network 106 may be a wide area network formed by an interconnected network of devices that may include, or may be communicatively coupled to, the Internet. The wireless access point 104 may provide a wireless local area network to the electronic devices 102A-B, and the wireless access point 104 may be communicatively coupled to the network 106, such as by a wide area network link, which may also be referred to as a backhaul. In one or more implementations, the wide area network link may be provided by, for example, an Internet service provider. The cellular base station 105 may also be communicatively coupled to the network 106 and may provide the electronic devices 102A-B with access to the network, such as via cellular data connections. As shown in FIG. 1, the cellular data connections through the cellular base station 105 bypass the wireless access point 104 when accessing the network 106.

Thus, the electronic devices 102A-B may be able to connect to the network 106 via a link formed by the wireless LAN provided by the wireless access point 104 and the wide area network link from the wireless access point 104 to the network 106, and/or via a link formed by cellular data connections through the cellular base station 105. However, the link formed by the cellular data connections through the cellular base station 105 may be associated with higher power consumption than the link through the wireless access point 104. In addition, the cellular data connections may incur usage fees. Thus, in one or more implementations, it may be preferable for one or more of the electronic devices 102A-B to connect to the network 106 via the wireless access point 104, as opposed to the cellular base station 105, when the link via the wireless access point 104 is available.

The subject system enables the electronic devices 102A-B to adaptively assess the wide area network link between the wireless access point 104 to the network 106 in order to determine when the wide area network link is broken. A WAN link may be determined to be broken when the link is lost or when it is not satisfying a minimum performance threshold based on one or more factors. The subject system starts the link assessment using a passive assessment of data, such as connection information corresponding to application data already being transmitted by the electronic devices 102A-B to the network 106. When the passive assessment provides an indication that the wide area network link may be broken, the subject system adaptively escalates the passive assessment to analyze more and/or different information, e.g., associated with the link. When the escalated passive assessment of the expanded breadth of information provides a sufficient indication that the wide area network link is broken, the subject system adaptively escalates to an active assessment, in which a probe operation is performed with respect to one or more known stable servers on the network 106. Conversely, the adaptive wide area link assessment can de-escalate the assessments when certain conditions are met that provide a sufficient indication that the wide area network link is not broken.

An example state diagram illustrating the various escalations and de-escalations of the subject adaptive wide area network link assessment system are discussed further below with respect to FIG. 3. An example process of an electronic device 102A implementing an adaptive wide area network link assessment system is discussed further below with respect to FIG. 4.

Figure 2:
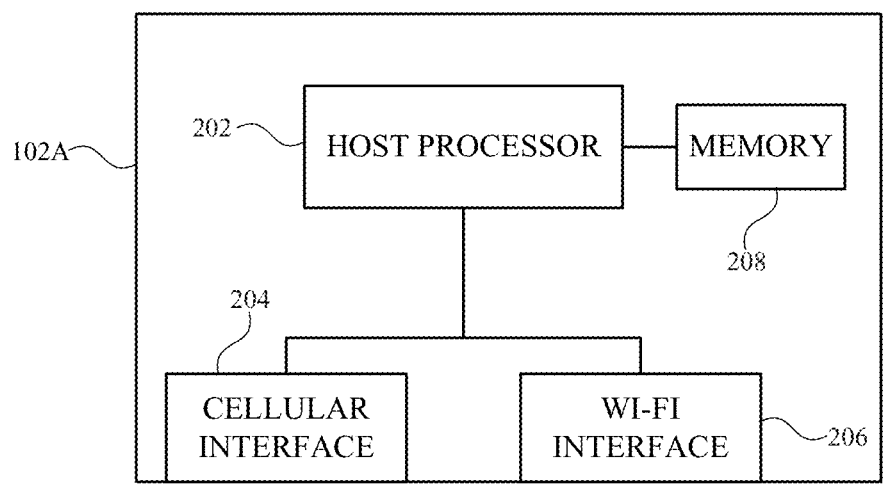
FIG. 2 illustrates an example electronic device that may implement an adaptive wide area network link assessment system in accordance with one or more implementations.

FIG. 2 illustrates an example electronic device 102A that may implement an adaptive wide area network link assessment system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by the electronic device 102B.

The electronic device 102A includes a host processor 202, a cellular interface 204, a Wi-Fi interface 206, and a memory 208. The cellular interface 204 may be and/or may include a cellular radio and the Wi-Fi interface 206 may be and/or may include a Wi-Fi radio. In one or more implementations, the Wi-Fi interface 206 may include and/or may implement one or more other radios, such as a Bluetooth radio. The cellular interface 204 may execute cellular firmware to perform one or more cellular operations, and the Wi-Fi interface 206 may execute Wi-Fi firmware to perform one or more Wi-Fi operations.

For explanatory purposes, the electronic device 102A is illustrated as including a cellular interface 204 and a Wi-Fi interface 206; however, the electronic device 102A may include any other wireless interfaces in lieu of, and/or in addition to, one or more of the cellular interface 204 and the Wi-Fi interface 206, such as 60 GHz wireless interfaces, or generally any wireless interfaces. Thus, the interfaces 204, 206 of the electronic device 102A may generally be referred to as a first wireless interface and a second wireless interface.

The cellular interface 204 may provide for communication of signals in accordance with a variety of cellular communication standards, such LTE, WCDMA, and the like. The Wi-Fi interface 206 may provide for communication of signals in accordance with one or more Wi-Fi standards, such as, for example, 802.11ac, 802.11ax, etc.

The host processor 202 may include suitable logic, circuitry, and/or code that enable processing data and/or controlling operations of the electronic device 102A. In this regard, the host processor 202 may be enabled to provide control signals to various other components of the electronic device 102A. The host processor 202 may also control transfers of data between various portions of the electronic device 102A. Additionally, the host processor 202 may enable implementation of an operating system or otherwise execute code to manage operations of the electronic device 102A.

The host processor 202 may, for example, coordinate transferring or switching data connections between the cellular interface 204 and the Wi-Fi interface 206. For example, the host processor 202 may be able to designate one of the interfaces 204, 206 as the primary interface, where the primary interface is used by the electronic device 102A for transmitting data, such as to a wide area network. Thus, the host processor 202 may transfer or switch data connections between the interfaces 204, 206 by changing which interface is designated as the primary interface.

The memory 208 may include suitable logic, circuitry, and/or code that enable storage of various types of information such as received data, generated data, code, and/or configuration information. The memory 208 may include, for example, random access memory (RAM), read-only memory (ROM), flash, and/or magnetic storage.

In one or more implementations, one or more of the host processor 202, the cellular interface 204, the Wi-Fi interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination thereof.

Figure 3:
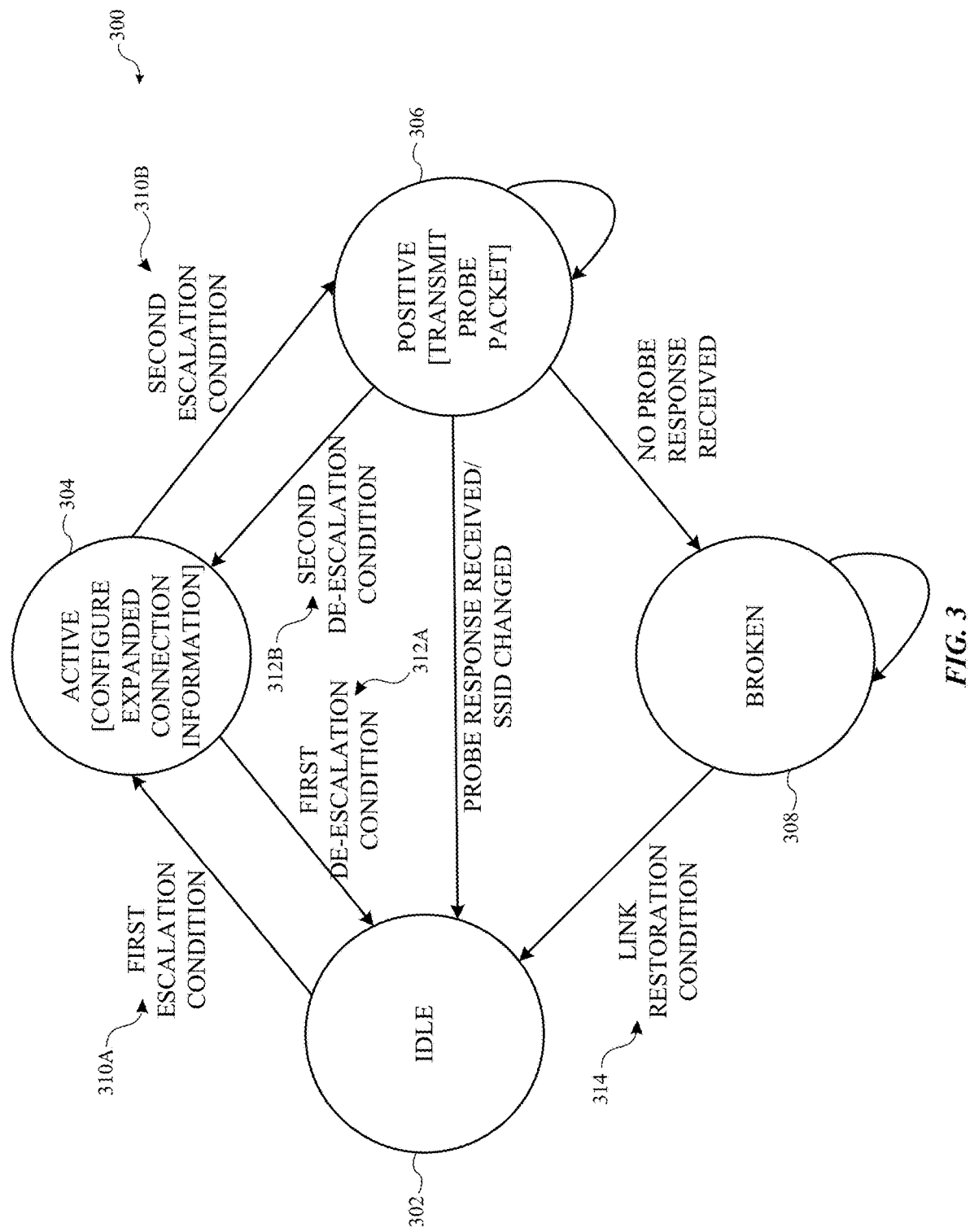
FIG. 3 illustrates a state diagram of example link assessment states in an adaptive wide area network link assessment system in accordance with one or more implementations.

FIG. 3 illustrates a state diagram 300 of example link assessment states in accordance with one or more implementations. Not all of the depicted states may be used in all implementations, however, and one or more implementations may include additional or different states than those shown in the figure. Variations in the arrangement of the states may be made without departing from the spirit or scope of the claims as set forth herein. Additional states, different states, or fewer states may be provided. For explanatory purposes, the state diagram 300 is discussed herein with reference to the electronic device 102A; however, the state diagram is also applicable to the electronic device 102B and/or other electronic devices.

The state diagram 300 includes an idle state 302, an active state 304, a positive state 306, and a broken state 308. In addition, the state diagram 300 includes a first escalation condition 310A that causes an escalation from the idle state 302 to the active state 304, a second escalation condition 310B that causes an escalation from the active state 304 to the positive state 306, a link restoration condition 314 which causes a transition from the broken state 308 to the idle state 302, a first de-escalation condition 312A which causes a de-escalation from the active state 304 to the idle state 302, and a second de-escalation condition which causes a de-escalation from the positive state 306 to the active state 304. In some implementations, one or more additional and/or different escalation and de-escalation conditions can be used.

In the idle state 302, the electronic device 102A monitors whether a user is interacting with the electronic device 102A, whether the cellular interface 204 is active and a cellular data connection is ready to use, whether the Wi-Fi interface 206 is currently designated as the primary interface, whether the signal strength between the electronic device 102A and the wireless access point 104 meets a particular threshold, such as an RSSI greater than, e.g. −70 dB, −80 dB, or generally any RSSI. The particular threshold for the RSSI is used to rule out link issues between the electronic device 102A and the wireless access point 104, such that they are not misconstrued as issues between the wireless access point 104 and the network 106. In one or more implementations, the electronic device 102A can passively monitor one or more of these conditions, e.g., without actively transmitting one or more probes or diagnostic packets.

While also in the idle state 302, the electronic device 102A can monitor domain name service (DNS) server failures, which may be indicated in data being received by the electronic device 102A, such as responses indicating DNS errors. The electronic device 102A may also monitor the connection/write flags for the transmission control protocol (TCP) connections over the Wi-Fi interface 206, which may be indicative of a problem at the TCP level. For example, the electronic device 102A may determine a connection/write ratio with the numerator set to the number of TCP connections with either a C or W bit (or flag) asserted, and the denominator being the total number of TCP connections that were established over a particular period of time, such as the last 30 seconds. In one or more implementations, the numerator may only include the number of TCP connections that had the C or W bit set over the particular period of time. In one or more implementations, the C bit is set on a TCP flow (or TCP connection) when the flow has sent Nx SYM packets without receiving a response, and the W bit may be set on a TCP flow (or TCP connection) when the flow has retransmitted the same packet Nx times without receiving an ACK, where Nx is a tunable factor and may be initially set to, for example, 5.

In one or more implementations, in the idle state 302 the electronic device 102A may also monitor the connectivity of a daemon running on the operating system of the electronic device 102A. The daemon may, for example, maintain a long-lived connection to a particular server and the daemon may provide a notification when it is unable to contact the server, as well as when connectivity with the server resumes.

While in the idle state 302, the electronic device 102A may determine that the first escalation condition 310A is satisfied, for example, when a user is interacting with the electronic device 102A, the cellular interface 204 is active and a cellular data connection is ready to use, the Wi-Fi interface 206 is set as the primary interface, the signal strength with the respect to the wireless access point 104 meets a particular threshold, and one or more of: all of the DNS servers are penalized (e.g. all of the DNS servers are experiencing failures), the connection/write ratio (C and W bits) is greater than a particular threshold (e.g., zero), and/or the daemon has indicated a connectivity failure.

When the first escalation condition 310A is satisfied, the electronic device 102A escalates to the active state 304. In the active state 304, the electronic device expands (or changes) the breadth of connection information available for the passive assessment, such as by configuring the networking stack to enable TCP keepalive messages for any/all TCP connections over the Wi-Fi interface 206. Thus, all of the connections over the Wi-Fi interface 206 may be expecting keepalive messages to ensure that the connections are progressing.

When in the active state 304, the electronic device 102A may continue to monitor the same factors that resulted in the first escalation condition 310A being met. The electronic device 102A also begins to assess the number of TCP connections that have the C or R/W bits set, which may correspond to read flags for the TCP connections over the Wi-Fi interface 206. Since one, some, or all of the Wi-Fi connections have keepalive messages enabled, the number of TCP connections with the C, R, or W bits set is expected to increase when there are packet errors over the wide area network link. In one or more implementations, an R bit may be set on a TCP flow (or TCP connection) when the flow has sent Nx keepalive frames without receiving any reply. The electronic device 102A may determine a connection/read/write ratio with the numerator set to the number of TCP connections with either the C, R, or W bits asserted, and the denominator set to the total number of TCP connections that were established over a particular period of time, such as the last 30 seconds. In one or more implementations, the numerator may only include the number of TCP connections that had the C or W bit set over the particular period of time.

While in the active state 304, the electronic device 102A may determine that the second escalation condition 310B is satisfied, for example, when a user is interacting with the electronic device 102A, the cellular interface 204 is active and a cellular data connection is ready to use, the Wi-Fi interface 206 is set as the primary interface, the signal strength with the respect to the wireless access point 104 meets a particular threshold, and one or more of: the electronic device 102A has access to an Internet DNS servers and all DNS servers are penalized (e.g., experiencing failures), the connection/read/write ratio is greater than a threshold (the threshold itself being greater than the threshold used in the idle state 302), and/or whether the daemon has indicated continued connectivity failures.

Conversely, while in the active state 304, the first de-escalation condition 312A may be satisfied when any of the factors that resulted in the first escalation condition 310A being satisfied are no long true. In this instance, the electronic device 102A transitions from the active state 304 back to the idle state 302, and configures the networking stack to disable keepalive messages, thereby reducing the breadth of connection information available to assess, since the wide area network link is deemed less likely to be broken.

When the second escalation condition 310B is satisfied while in the active state 304, the electronic device 102A adaptively escalates from the passive assessment to an active assessment in the positive state 306. In the positive state 306, the electronic device 102A configures the networking stack to disable keepalive messages, thereby reducing the connection information available to passively assess (since the electronic device 102A is now performing an active assessment), and the electronic device 102A performs a probe operation (e.g. transmits one or more probe packets) to one or more specific, known, and stable endpoints on the network 106, such as a server on the network 106. The electronic device 102A then waits a predetermined amount of time for a response.

If the second de-escalation condition 312B is satisfied while the electronic device is awaiting the response, the electronic device 102A may adaptively de-escalate the assessment to the active state 304. The second de-escalation condition 312B may be met, for example, when the electronic device 102A determines that the user is no longer interacting with the electronic device 102A, which may be a matter of policy since a user interaction on a smartwatch may be too short and unpredictable. However, de-escalation can result based on any selected condition or conditions.

If a probe response is received and/or if the electronic device 102A determines that the service set identifier (SSID) has changed, e.g. that the Wi-Fi interface is connected to a different wireless access point 104 and possibly a different wide area network link, the electronic device 102A transitions back to the idle state 302. If the electronic device 102A transitions to the idle state 302 because the probe response was received, the electronic device 102A applies dampening to the Wi-Fi interface 206. Dampening may refer to a timeout that is applied before transitioning to the active state 304 after one or more consecutive false positives, e.g. where a probe packet response was received after transmitting a probe packet. The length of the timeout may be based on the number of consecutive false positives. For example, the length of the timeout may increase for each consecutive false positive until some maximum length is reached, at which point the length may reset to 0.

If no probe response is received, the electronic device 102A determines that the wide area network link is broken and transitions to the broken state 308. In the broken state 308, the electronic device 102A transfers the data connections from the Wi-Fi interface 206 to the cellular interface 204, such as by setting the cellular interface 204 as the primary interface and setting the Wi-Fi interface 206 as the secondary interface.

While in the broken state 308, the electronic device 102A may continue to monitor the Wi-Fi interface 206, which has been set as the secondary interface, for incoming traffic and/or for an SSID change. For example, one or more applications on the electronic device 102A may insist on using the Wi-Fi interface 206 even though the Wi-Fi interface 206 has been set to the secondary interface. If the electronic device 102A detects incoming traffic over the Wi-Fi interface 206, and/or if the electronic device 102A determines that the SSID has changed, the electronic device 102A may determine that the link restoration condition 314 is satisfied, and the electronic device 102A may transition back to the idle state 302.

Although specific examples of the escalation conditions 310A-B, de-escalation conditions 312A-B, and the link restoration condition 314 are described herein, in other implementations, any/all of the conditions 310A-B, 312A-B, 314 may be configurable, such as dynamically configurable, and/or configurable based on, for example, one or more rules provided by a server. Thus, any/all of the conditions 310A-B, 312A-B, 314 may be continually refined and/or adapted over time, such as to include additional metrics/information, and/or remove/modify existing metrics/information.

In one or more implementations, when the adaptive assessment represented by the state diagram 300 is implemented by a smartwatch, such as the electronic device 102B, the first and second escalation conditions 310A-B may be modified. For example, the first and second escalation conditions 310A-B may further require that the smartwatch not be connected to the network 106 through another electronic device, such as a mobile phone via a Bluetooth connection, that no voice call is active, and that the smartwatch has a cellular data capability (e.g., irrespective of whether a cellular data connection is currently active). In addition, the first and second escalation conditions 310A-B for a smartwatch may not require that a user be interacting with the smartwatch.

Figure 4:
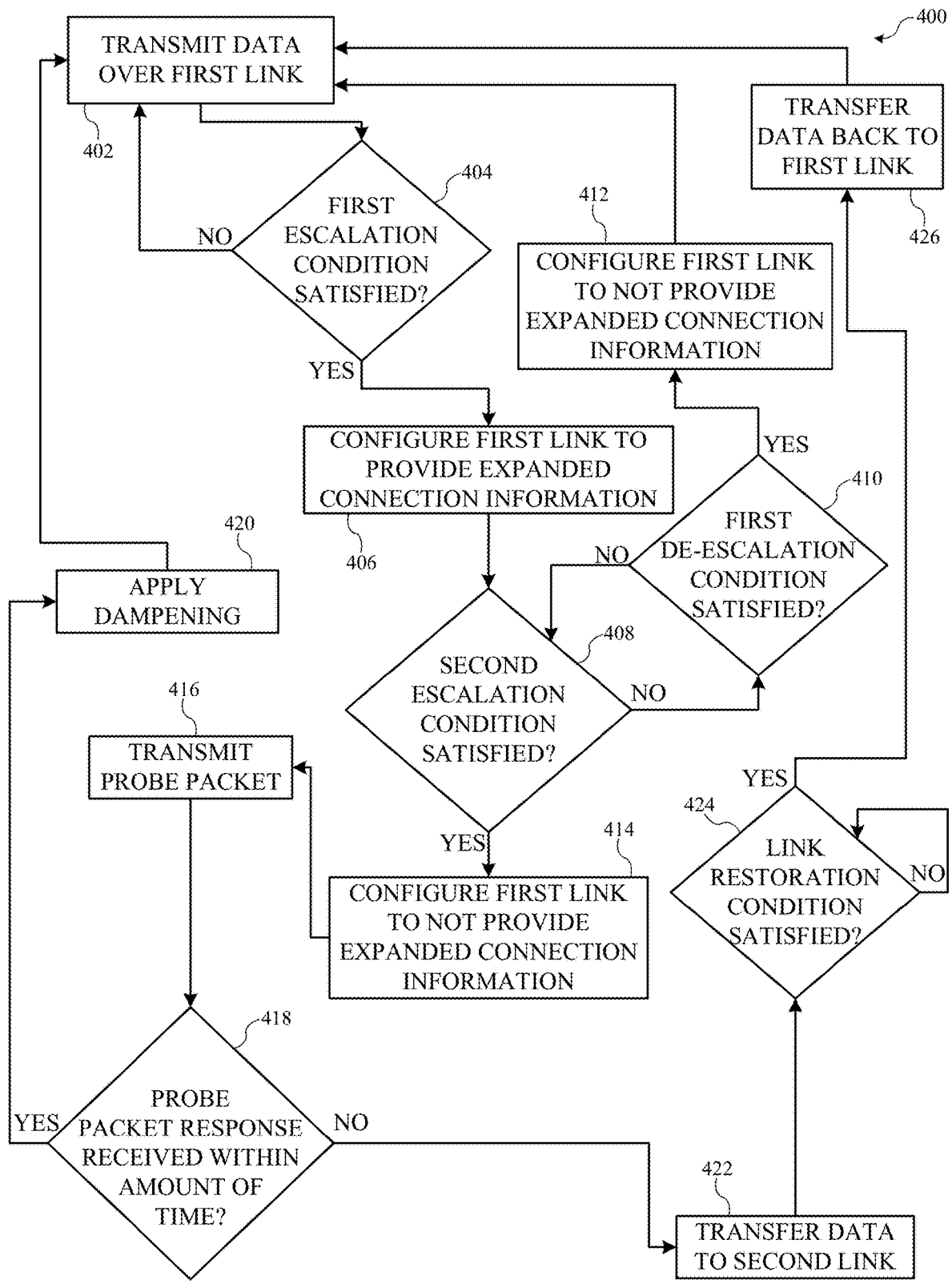
FIG. 4 illustrates a flow diagram of an example process of an electronic device implementing an adaptive wide area network link assessment system in accordance with one or more implementations.

FIG. 4 illustrates a flow diagram of an example process 400 of an electronic device 102A implementing an adaptive wide area network link assessment system in accordance with one or more implementations. For explanatory purposes, the process 400 is primarily described herein with reference to the electronic device 102A of FIGS. 1 and 2. However, the process 400 is not limited to the electronic device 102A of FIGS. 1 and 2, and one or more operations of the process 400 may be performed by one or more components of the electronic device 102A, such as the host processor 202, the cellular interface 204, and/or the Wi-Fi interface 206 of the electronic device 102A. The electronic device 102A also is presented as an exemplary device and the operations described herein may be performed by any suitable device, such as the electronic device 102B. Further for explanatory purposes, the operations of the process 400 are described herein as occurring in serial, or linearly. However, two or more operations of the process 400 may occur in parallel. In addition, the operations of the process 400 need not be performed in the order shown and/or one or more operations of the process 400 need not be performed and/or can be replaced by other operations. One or more additional operations also can be performed. Furthermore, it will be understood that the electronic device 102A may be transmitting data over one or more of the first or second links throughout the process 400, e.g., not only in the specific operations that describe transmitting data.

The process 400 begins when the electronic device 102A transmits data over a first link on a first wireless interface, such as a link to a wide area network (e.g., the network 106 and/or the Internet) on the Wi-Fi interface 206, while a link to the wide area network is available on the cellular interface 204 (402). The electronic device 102A determines whether the first escalation condition 310A is satisfied (404). If the electronic device 102A determines that the first escalation condition 310A is not satisfied (404), the electronic device 102A continues to transmit data to the wide area network over the first link on the Wi-Fi interface 206.

If the electronic device 102A determines that the first escalation condition 310A is satisfied (404), the electronic device 102A configures the first link on the Wi-Fi interface 206 to provided expanded connection information (406). For example, the electronic device 102A may enable keepalive messages in the networking stack for any/all connections. The electronic device 102A then determines whether the second escalation condition 310B is satisfied (408). If the electronic device 102A determines that the second escalation condition 310B is not satisfied (408), the electronic device 102A determines whether the first de-escalation condition 312A is satisfied (410), if the electronic device 102A determines that the first de-escalation condition 312A is satisfied (410), the electronic device 102A configures the connections on the first link to not provide the expanded connection information (412), such as by disabling keepalive messages on the networking stack, and the electronic device 102A continues transmitting data over the first link on the Wi-Fi interface 206 (402).

If the electronic device 102A determines that the second escalation condition 310B is satisfied (408), the electronic device 102A configures the connections on the first link to not provide the expanded connection information (414), such as by disabling keepalive messages on the networking stack, and the electronic device 102A transmits one or more probe packets to one or more known stable endpoints on the network 106 (416). The electronic device 102A determines whether a probe packet response was received within a threshold amount of time of sending the probe packet, e.g. before a timeout occurs (418).

The transmission/reception of probe packets/responses may be collectively referred to as a probe operation. In a probe operation, the name of the endpoint on the network 106 is resolved using DNS and then the electronic device 102A connects over TCP/HTTP to the endpoint address. The electronic device 102A issues an HTTP GET over the connection (e.g., transmits a probe, or probe packet), and receives a response from HTTP GET (e.g. receives a probe response or a probe response packet). Thus, if any of the steps of the probe operation fails, the electronic device 102A will not successfully complete the probe operation before the timeout occurs, and the electronic device 102A will not receive the probe response before the timeout occurs.

In one or more implementations, if the second de-escalation condition 312B is satisfied while the electronic device 102A is waiting for the probe response but before the timeout occurs, the electronic device 102A may reconfigure the first link to provide the expanded connection information (406) and check again whether the second escalation condition is still satisfied (408).

If the electronic device 102A determines that the probe packet response was received before the threshold amount of time (418), e.g., that a false positive occurred, the electronic device 102A applies or increases dampening to the first link (420) and continues to transmit data over the first link (402). If the electronic device 102A determines that the probe packet response was not received within the threshold amount of time (418), the electronic device 102A transfers the data connections to the second link, such as on the cellular interface 204 (422). For example, the electronic device 102A may set the cellular interface 204 to the primary interface and may set the Wi-Fi interface 206 to the secondary interface In one or more implementations, before transferring the data connections to the second link (422), the electronic device 102A may provide a prompt to the user to inform the user that the Wi-Fi connection to the network 106 is broken and to ask the user to approve of transferring the data connections to the cellular interface 204, and/or to select a different SSID for the Wi-Fi interface 206. If the user does not approve of the transfer, then the electronic device 102A may not transfer the data connections to the cellular interface 204.

After transferring the data connections to the second link on the cellular interface 204, the electronic device continues to monitor whether a link restoration condition is satisfied by the first link on the Wi-Fi interface 206 (424). If the electronic device 102A determines that the link restoration condition is satisfied (424), the electronic device 102A transfers the data connections back to the first link on the Wi-Fi interface 206 (426), and transmits data to the wide area network over the first link (402).

Figure 5:
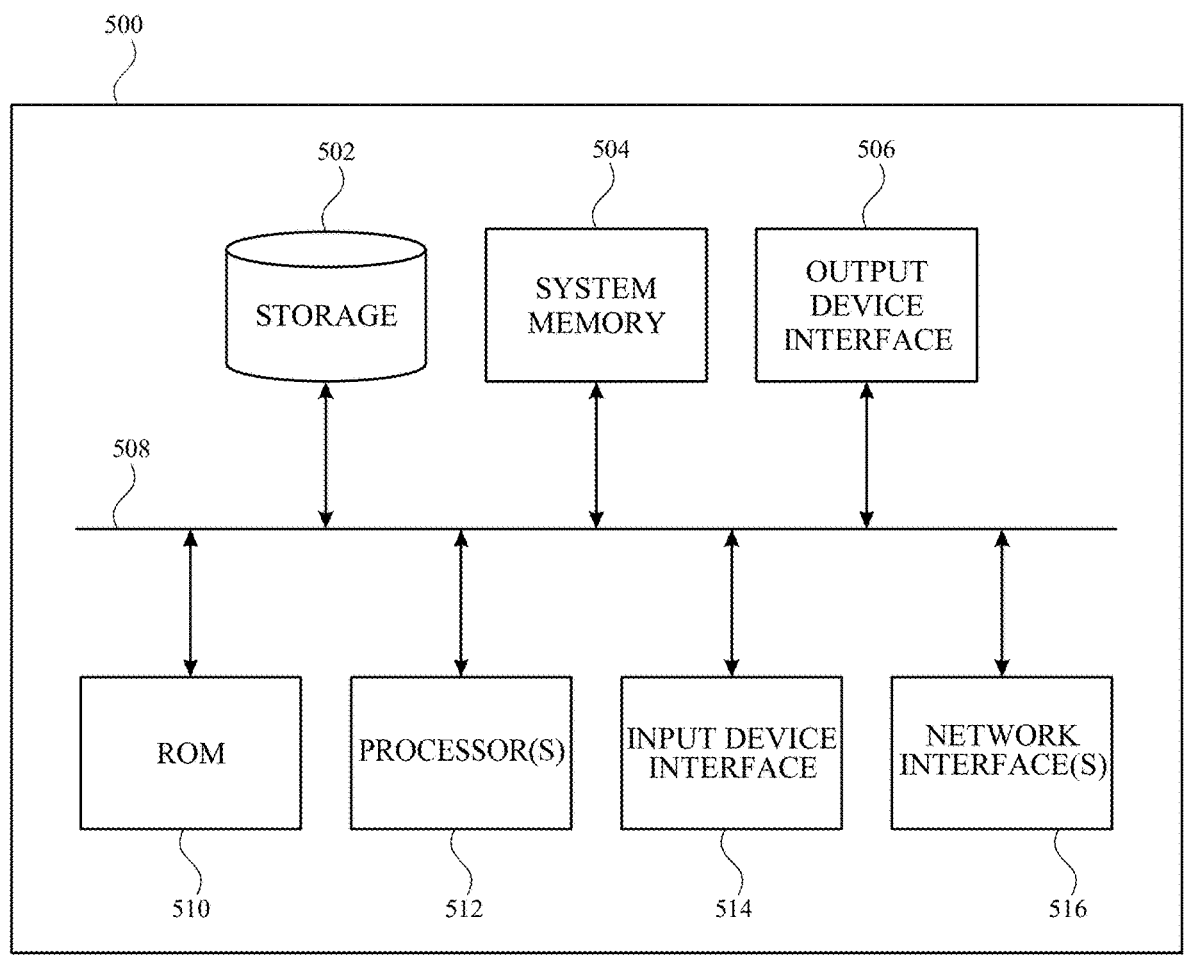
FIG. 5 conceptually illustrates an electronic system with which aspects of the subject technology may be implemented in accordance with one or more implementations.

FIG. 5 conceptually illustrates an electronic system 500 with which one or more implementations of the subject technology may be implemented. The electronic system 500 can be, and/or can be a part of, one or more of the electronic devices 102A-B, the wireless access point 104, and/or the cellular base station 105 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   a memory; and
   at least one processor configured to:
   transmit data to a wide area network over a first link on a first wireless interface while a second link on a second wireless interface is available to transmit the data to the wide area network;
   responsive to a first determination based at least in part on connection information associated with transmission of the data over the first link during a passive monitoring operation while the device is active and transmitting the data to the wide area network that a first escalation condition is satisfied, configure the first link to provide expanded connection information associated with the transmission of the data over the first link, the expanded connection information being expanded relative to the connection information;

responsive to a second determination based at least in part on the expanded connection information that a second escalation condition is satisfied during an active monitoring operation while the device is active and transmitting the data to the wide area network over the first link on the first wireless interface, transmit a probe packet to a server on the wide area network over the first link, the probe packet being distinct from the data transmitted over the first link; and when a response to the probe packet is not received within a predetermined amount of time, begin to transmit the data to the wide area network over the second link on the second wireless interface.

2. The device of claim 1, wherein the at least one processor is further configured to:

when the response to the probe packet is received within the predetermined amount of time, continue to transmit the data to the wide area network over the first link on the first wireless interface.

3. The device of claim 1, wherein the first link to the wide area network is over a local area network and the second link to the wide area network bypasses the local area network.

4. The device of claim 1, wherein the at least one processor is further configured to:

while the data is transmitted to the wide area network over the second link on the second wireless interface, determine that a link restoration condition is satisfied with respect to the first link on the first wireless interface; and responsive to a determination that the link restoration condition is satisfied, resume transmission of the data to the wide area network over the first link on the first wireless interface.

5. The device of claim 4, wherein the first wireless interface comprises a Wi-Fi interface and the second wireless interface comprises a cellular interface.

6. The device of claim 5, wherein the at least one processor is further configured to:

determine that the link restoration condition is satisfied when a change is detected with respect to a service set identifier (SSID) associated with the first wireless interface.

7. The device of claim 1, wherein the connection information associated with the data being transmitted over the first link comprises connection write flags for transmission control protocol (TCP) connections on the first link.

8. The device of claim 7, wherein the at least one processor is further configured to:

configure one or more of the TCP connections on the first link to transmit one or more TCP keepalive packets in order to configure the first link to provide the expanded connection information associated with the transmission of the data over the first link.

9. The device of claim 1, wherein the at least one processor is further configured to:

responsive to the second determination, based at least in part on the expanded to not provide the expanded connection information associated with the transmission of the data over the first link.

10. The device of claim 1, wherein the at least one processor is further configured to:

when the first link is configured to provide the expanded connection information, determine that the first escalation condition is not satisfied; and responsive to a third determination that the first escalation condition is not satisfied, configure the first link to not provide the expanded connection information associated with the transmission of the data over the first link.

11. A method comprising:

determining that a first escalation condition is satisfied for a first link based at least in part on connection information corresponding to data connections over the first link and without transmitting additional data over the first link;

responsive to determining that the first escalation condition is satisfied, configuring the data connections to provide expanded connection information corresponding to the data connections, the expanded connection information being expanded relative to the connection information;

responsive to determining, based on the expanded connection information, that a second escalation condition is satisfied, transmitting a probe packet to a server, and responsive to determining, based on the connection information, that a first de-escalation condition is satisfied, configuring the data connections to not provide the expanded connection information; and when a response to the probe packet is not received within a predetermined amount of time, transferring the data connections to a second link, wherein the first link is through an intermediary device and the second link bypasses the intermediary device.

12. The method of claim 11, further comprising:

responsive to determining, based on the expanded connection information, that the second escalation condition is satisfied, configuring the data connections to not provide the expanded connection information.

13. The method of claim 12, further comprising:

while awaiting the response to the probe packet within the predetermined amount of time, determining that a second de-escalation condition is satisfied; and responsive to determining that the second de-escalation condition is satisfied, configuring the data connections to provide the expanded connection information.

14. The method of claim 11, further comprising:

after transferring the data connections to the second link, determining that a link restoration condition is satisfied with respect to the first link; and responsive to determining the link restoration condition is satisfied, transferring the data connections back to the first link.

15. The method of claim 11, wherein the intermediary device comprises a wireless access point for a local area network.

16. The method of claim 11, further comprising:

when the response to the probe packet is received within the predetermined amount of time, waiting another predetermined amount of time before determining whether the first escalation condition is satisfied, wherein the other predetermined amount of time is determined based at least in part on a number of consecutive times that the probe packet has been transmitted and received.

17. A system comprising:

a Wi-Fi interface on which a first link is established;

a cellular interface on which a second link is established; and at least one processor configured to:

transmit data over the first link on the Wi-Fi interface;
responsive to a first determination based at least in part on connection information corresponding to the data transmitted over the first link that a first escalation condition is satisfied, configure the first link to provide expanded connection information corresponding to the data transmitted over the first link, the expanded connection information being expanded relative to the connection information;
responsive to a second determination that a first de-escalation condition is satisfied subsequent to the first determination that the first escalation condition is satisfied, configuring the first link to not provide the expanded connection information;
responsive to a third determination that a second escalation condition is satisfied subsequent to the first determination that the first escalation condition is satisfied, perform a probe operation; and when the probe operation is not successful within a predetermined amount of time, transmit the data over the second link on the cellular interface instead of over the first link on the Wi-Fi interface.

18. The system of claim 17, wherein the data transmitted over the first link comprises application data.

19. The system of claim 18, wherein the first and second determinations are made based on the application data transmitted over the first link without transmission of a separate diagnostic packet.

20. The system of claim 17, wherein the at least one processor is further configured to:
before transmission of the data over the second link on the cellular interface, provide a prompt for display to a user to request approval to transmit the data over the second link on the cellular interface.

* * * * *